United States Patent
Clemente et al.

(10) Patent No.: US 8,817,439 B2
(45) Date of Patent: Aug. 26, 2014

(54) POWER DELIVERY CIRCUIT HAVING PROTECTION SWITCH FOR REVERSE BATTERY CONDITION

(75) Inventors: Stefano Clemente, Rolling Hills Estates, CA (US); Cesare Bocchiola, Settimo (IT)

(73) Assignee: International Rectifier Corporation, El Segundo, CA (US)

( * ) Notice: Subject to any disclaimer, the term of this patent is extended or adjusted under 35 U.S.C. 154(b) by 192 days.

(21) Appl. No.: 12/653,101

(22) Filed: Dec. 7, 2009

(65) Prior Publication Data
US 2011/0134576 A1  Jun. 9, 2011

(51) Int. Cl.
*H02H 3/00* (2006.01)

(52) U.S. Cl.
USPC .......................................................... 361/84

(58) Field of Classification Search
USPC .......................................................... 361/84
See application file for complete search history.

(56) References Cited

U.S. PATENT DOCUMENTS

| | | | | |
|---|---|---|---|---|
| 5,723,916 A * | 3/1998 | Disney et al. | ................. | 307/131 |
| 6,043,965 A * | 3/2000 | Hazelton et al. | ................. | 361/84 |
| 7,724,046 B2 * | 5/2010 | Wendt et al. | ................... | 327/110 |
| 7,961,482 B2 * | 6/2011 | Ribarich | .................... | 363/21.03 |
| 2002/0017942 A1 * | 2/2002 | Dubhashi et al. | ............. | 327/325 |
| 2002/0141124 A1 * | 10/2002 | Ito et al. | .......................... | 361/84 |
| 2007/0001255 A1 * | 1/2007 | Lin | ................................ | 257/467 |
| 2008/0012543 A1 * | 1/2008 | Negoro | ........................ | 323/272 |
| 2008/0247108 A1 * | 10/2008 | Ando et al. | ..................... | 361/84 |
| 2011/0098011 A1 * | 4/2011 | Camp et al. | ................ | 455/114.3 |

* cited by examiner

*Primary Examiner* — Ronald W Leja
(74) *Attorney, Agent, or Firm* — Farjami & Farjami LLP

(57) ABSTRACT

According to one disclosed embodiment, a power delivery circuit includes a switch for protection of a load in a reverse battery condition. The load is coupled in cascade with the protection switch, where the protection switch disconnects the load from the battery in the reverse battery condition. The protection switch does not include p-n junction diodes present in conventional protection switches using FETs. The protection switch utilizes, for example, a GaN HEMT, that does not include a p-n junction diode. Thus, the threat of internal conduction in the protection switch during a reverse battery condition is eliminated. The power delivery circuit also protects the load in a load dump condition.

20 Claims, 2 Drawing Sheets

POWER DELIVERY CIRCUIT HAVING PROTECTION SWITCH FOR REVERSE BATTERY CONDITION

BACKGROUND OF THE INVENTION

1. Field of the Invention

The present invention is generally in the field of electronic circuits. More particularly, the invention is directed to power delivery circuits having load protection.

2. Background Art

An electrical system, such as an automotive electrical system, includes a power delivery circuit for providing power to electrical loads. Power delivery circuits often include electrical protection circuitry for protecting loads from unfavorable electrical conditions. One unfavorable electrical condition that can occur in an electrical system is a "reverse battery condition." This can occur, for example, in an automotive electrical system, when a battery is undesirably connected to the electrical system with its terminals reversed from regular operating condition. Another such unfavorable electrical condition that can occur is a "load dump condition," in which, a load is inadvertently disconnected from an electrical system, causing a substantial voltage spike in the electrical system. This can occur, for example, in an automotive electrical system when a terminal of a battery, driven by an alternator, becomes disconnected.

Conventional electrical protection circuits use FETs (e.g. MOSFETs) and surge suppressors to protect loads from unfavorable voltage conditions. For example, a FET can be cascaded with a load to be protected. However, because a FET comprises an intrinsic diode at a p-n junction, under reverse battery conditions, the intrinsic diode can become forward biased and a reverse voltage can be applied to the load, which can damage the components of an electrical system. In order to avoid this threat present in conventional electrical protection circuits that use FETs and surge suppressors, complex circuits might be needed, which increases manufacturing costs.

Thus, there is a need in the art for power delivery systems that can, for example, protect electrical loads in a reverse battery condition without a need for complex circuitry required to address the potential threats present in the conventional electrical protection circuits that are used, for example, in automotive electrical systems.

SUMMARY OF THE INVENTION

Power delivery circuit having protection switch for reverse battery condition, substantially as shown in and/or described in connection with at least one of the figures, and as set forth more completely in the claims.

DETAILED DESCRIPTION OF THE INVENTION

The present invention is directed to a power delivery circuit having protection switch for reverse battery condition. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention.

The drawings in the present application and their accompanying detailed description are directed to merely exemplary embodiments of the invention. To maintain brevity, other embodiments of the present invention are not specifically described in the present application and are not specifically illustrated by the present drawings.

Figure 1:
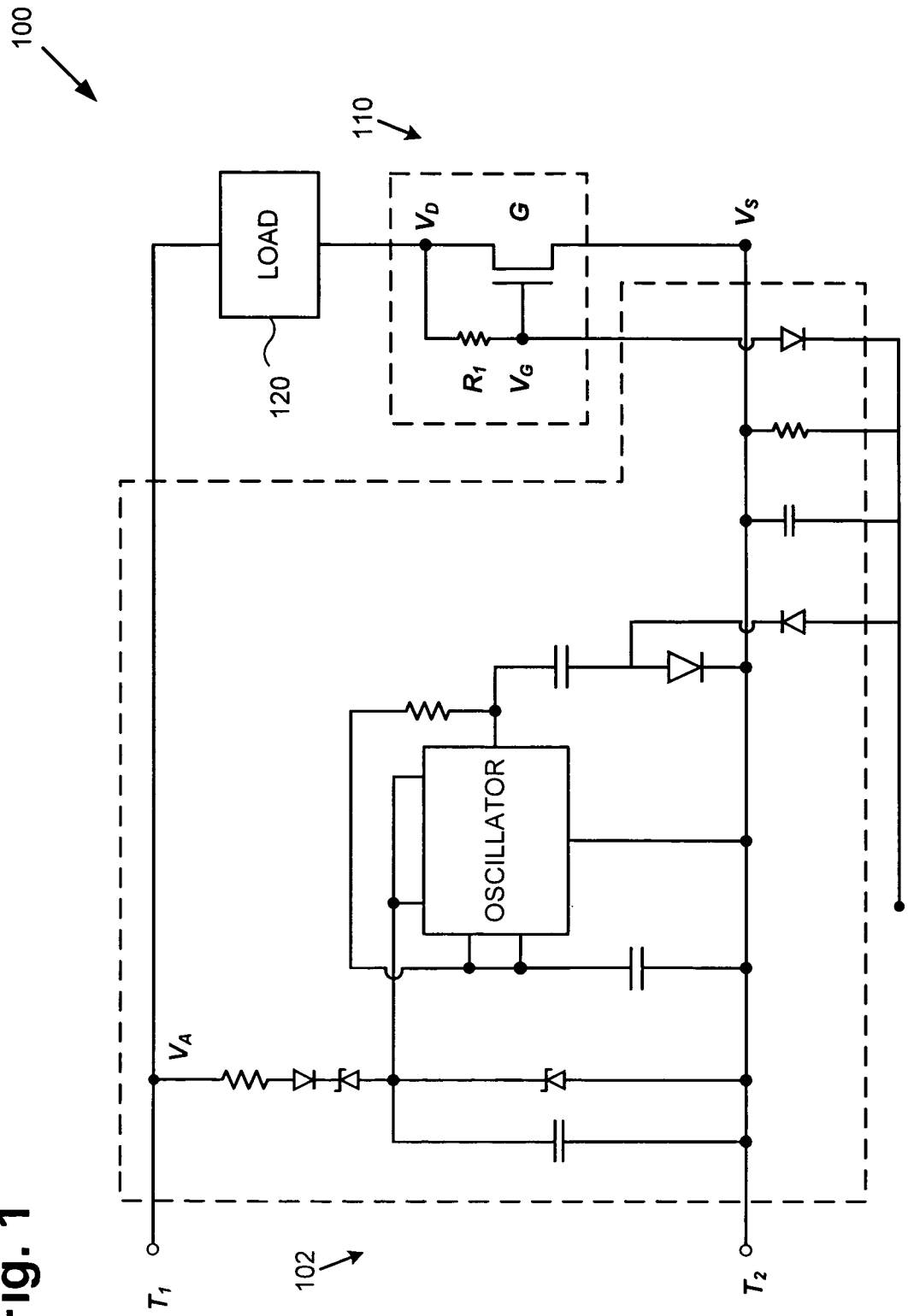
FIG. 1 shows an overview of an embodiment of the invention's power delivery circuit having protection from reverse battery conditions.

Referring to FIG. 1, an overview of an embodiment of the invention's power delivery circuit having protection from reverse battery conditions is shown. In FIG. 1, power delivery circuit 100 includes, among other elements not shown, load 120, protection switch 110, load dump protection circuitry 102, and terminals $T_1$ and $T_2$.

Power delivery circuit 100 is configured to provide power for an electrical load, for example, load 120 under regular operating conditions. Furthermore, power delivery circuit 100 can be included in an automotive electrical system. Power delivery circuit 100 has protection circuitry for protecting load 120 from unfavorable electrical conditions. For example, as shown in FIG. 1, power delivery circuit 100 includes protection switch 110 and load dump protection circuitry 102 for protecting load 120 from load dump and reverse battery conditions. Notably, the combination of protection switch 110 and load dump protection circuitry 102 forms power delivery circuit 100 that can protect load 120 from reverse battery conditions and from load dump conditions.

As shown in FIG. 1, power delivery circuit 100 has terminals $T_1$ and $T_2$ for electrically coupling power delivery circuit 100 to a power source. For example, terminals $T_1$ and $T_2$ can comprise battery terminals for connecting an automotive battery to power delivery circuit 100 (not shown in FIG. 1). Terminal $T_2$ is electrically connected to load dump protection circuitry 102 and protection switch 110 and terminal $T_1$ is electrically connected to load dump protection circuitry 102 and load 120.

In FIG. 1, load 120 can include an electrical component in an automotive electrical system. Load 120 can comprise, for example, a radio, a microprocessor, an electrical control unit, or other electronic loads. It will be appreciated that load 120 can comprise a plurality of protected loads. Load 120 can be powered in power delivery circuit 100 while being protected from load dump and reverse battery conditions without the threat of damage from internal conduction, for example, an internal short circuit in protection switch 110. Load 120 is electrically coupled to protection switch 110.

Also in FIG. 1, protection switch 110 has resistor $R_1$ and transistor G. In FIG. 1, protection switch 110 is cascaded with load 120 can provide current to load 120 under regular operating conditions. Protection switch 110 does not have a p-n junction diode connectable to a battery. Furthermore, transistor G does not have an intrinsic diode formed at a p-n junction. For example, in power delivery circuit 100, transistor G is a GaN (gallium nitride) high electron mobility transistor (HEMT). Thus, under reverse battery conditions transistor G can block a reverse voltage, thereby protecting load 120.

In protection switch 110, transistor G has a source, gate, and drain and resistor $R_1$, with a resistance of 10 k ohms, couples the drain and gate of transistor G. Transistor G is an enhancement mode HEMT having a negative threshold. Thus, transistor G is configured to be on responsive to having a voltage difference between its gate and source rise above a negative threshold voltage and to be off responsive to having the voltage difference fall below the negative threshold voltage. As one example, in protection switch 110, transistor G has a threshold voltage at around −3 volts. However, this threshold voltage can be different in various embodiments of the present invention. In FIG. 1, the source of transistor G is connectable to a battery via terminal $T_2$ and the gate of transistor G is coupled to load dump protection circuitry 102, which will be described with more particularity later in reference to FIG. 2.

Under a regular operating condition, a power source, for example, an automotive battery, is electrically connected to power delivery circuit 100 via terminals $T_1$ and $T_2$. The positive terminal of the battery is connected to terminal $T_1$ and the negative terminal of the battery is connected to terminal $T_2$ such that a positive voltage is applied across power delivery circuit 100. The battery may provide, for example, 12 volts to power delivery circuit 100 at node A ($V_A$) and 0 volts to power delivery circuit 100 at node S ($V_S$). In a regular operating condition, protection switch 110 provides current to load 120. Thus, the voltage at node D ($V_D$) is low, for example, around 0.2 volts, and power delivery circuit 100 is providing power to load 120. Furthermore, the gate of transistor G is not drawing any current and therefore, the voltage at node G is also around 0.2 volts. Therefore, $V_{GS}$ is about 0.2 volts, which is above the negative threshold of transistor G. Thus, protection switch 110 is connecting load 120 to the battery. In an embodiment of the present invention, because transistor G is a GaN HEMT, as opposed to, for example, a silicon-based FET, transistor G can have a very low on-resistance resulting in a minimal voltage drop across transistor G. Furthermore, transistor G can provide other properties desirable in a power delivery circuit, such as high power density.

Power delivery circuit 100 can protect electrical components in an electrical system from a "reverse battery condition." A reverse battery condition can occur when a power source is connected to power delivery circuit 100 in reverse from a regular operating condition. For example, due to human error, an automotive battery can inadvertently be connected, with reversed polarities, to power delivery circuit 100 via terminals $T_1$ and $T_2$. In other words, the positive terminal of the automotive battery can be inadvertently connected to battery terminal $T_2$ and the negative terminal of the automotive battery can be inadvertently connected to battery terminal $T_1$ such that a negative voltage is applied across power delivery circuit 100. Thus, in an embodiment of the present invention, under a reverse battery condition, $V_A$ is around 0 volts while $V_S$ is around 12 volts.

Furthermore, in a reverse battery condition, $V_D$ and $V_G$ are very low, for example, around 0 volts. Therefore, in the present example, $V_{GS}$ is approximately −12 volts, far below the −3 volt threshold of transistor G. Thus transistor G is off and load 120 is disconnected from the automotive battery by protection switch 110. As such, transistor G is operating properly and load 120 is protected from a reverse battery condition.

Advantageously, connecting power delivery circuit 100 to a battery in a reverse configuration does not result in forward bias condition, which can occur with in a FET based protection switch. For example, in a FET based protection switch, a FET source region is shorted to a substrate. Source/drain regions and a substrate in the FET have opposing conductivity types. For example, source/drain regions can be n-type and the substrate can be p-type. Thus, when $V_S$ is 12 volts and $V_D$ is 0 volts, as can occur in a reverse battery condition, the intrinsic diode formed at a p-n junction in the FET can become biased creating an internal conduction, for example, an internal short circuit. In this way, a FET-based protection switch does not disconnect load 120 from the automotive battery and electrical components are exposed to unfavorable electrical conditions.

In the present invention, protection switch 110, using for example a GaN HEMT, does not have an intrinsic diode formed at a p-n junction that is connectable to the battery. Thus, connecting power delivery circuit 100 in a reverse battery condition does not create an internal conduction, for example an internal short circuit in power switch 110 and electrical components in power delivery circuit 100 are protected from unfavorable electrical conditions.

Figure 2:
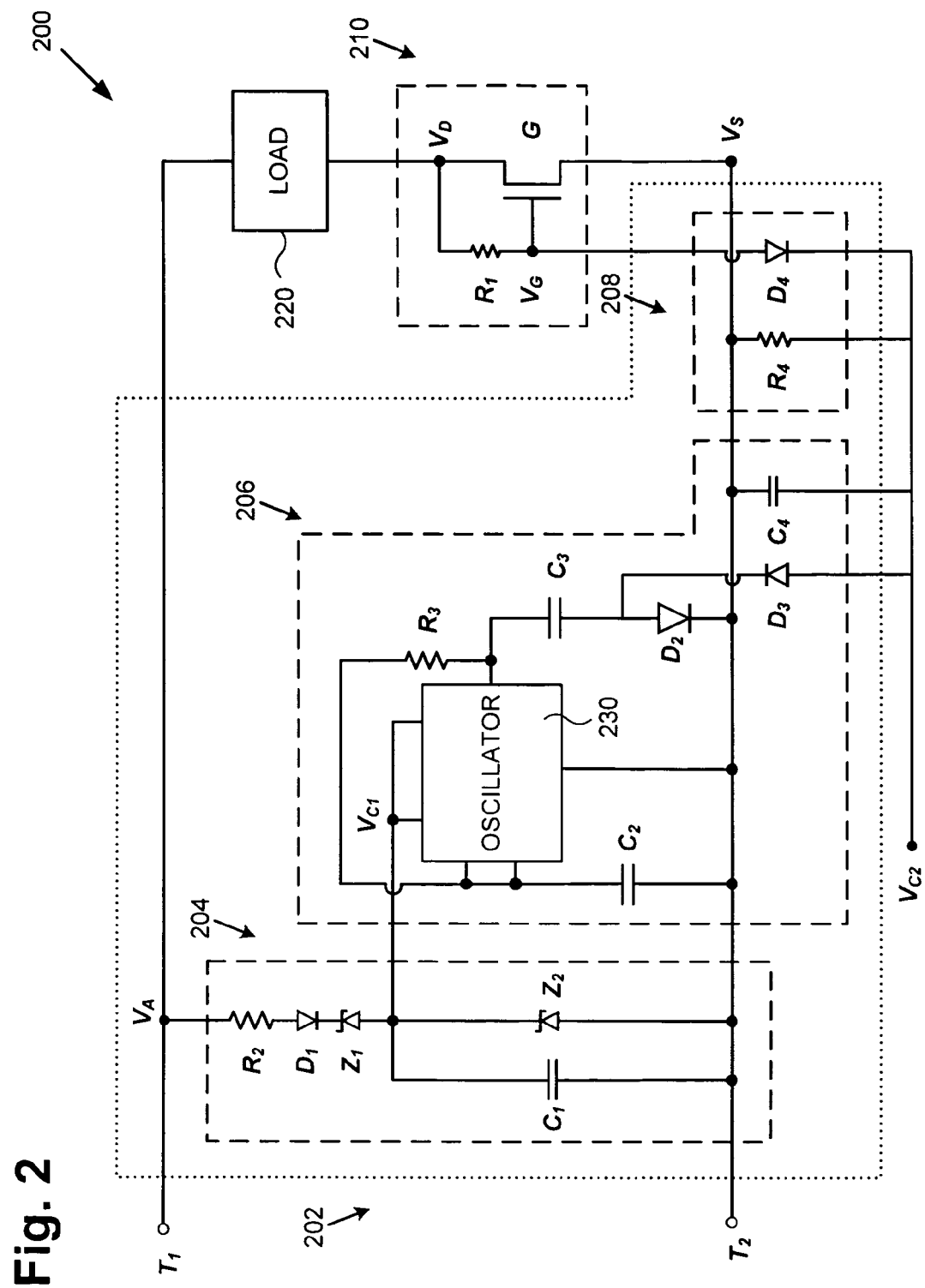
FIG. 2 illustrates the embodiment of FIG. 1 in greater detail.

Referring now to FIG. 2, power delivery circuit 200 corresponds to power delivery circuit 100 and includes corresponding elements. As shown in FIG. 2, power delivery circuit 200 includes load dump protection circuitry 202. In FIG. 2, load dump protection circuitry 202 is electrically connected to terminals $T_1$ and $T_2$, load 220, and protection switch 210. Load dump protection circuitry 202 comprises surge detector circuitry 204, charge pump circuitry 206, and charge pump interface circuitry 208 and is configured to assist power delivery circuit 200 in protecting electrical components from a load dump condition.

As shown in FIG. 2, surge detector circuitry 204 includes resistor $R_2$, diode $D_1$, capacitor $C_1$ and zener diodes $Z_1$ and $Z_2$. In an embodiment of the present invention, in surge detector circuitry 204, resistor $R_2$ has a resistance of 220 ohms, zener diode $Z_1$ has a breakdown voltage at 12 volts and zener diode $Z_2$ has a breakdown voltage at 15 volts. Surge detector circuitry 204 is electrically connected to charge pump circuitry 206.

Also in FIG. 2, charge pump circuitry 206 includes resistor $R_3$, diodes $D_2$ and $D_3$, capacitors $C_2$, $C_3$, and $C_4$, and oscillator 230. In an embodiment of the present invention, in charge pump circuitry 206, capacitor $C_3$ has a capacitance of 20 m Farads, and capacitor $C_4$ has a capacitance of 47 m Farads. Also, charge pump circuitry 206 can comprise a negative voltage charge pump. Charge pump circuitry 206 is connected to charge pump interface circuitry 208.

In FIG. 2, charge pump interface circuitry 208 includes resistor $R_4$ and diode $D_4$ and is electrically connected to protection switch 210. In an embodiment of the present invention, in charge pump interface circuitry 208, resistor $R_4$ has a resistance of 47 k ohms.

Further shown in FIG. 2, power delivery circuit 200 can protect electrical components in an electrical system from a "load dump condition." A load dump condition can occur, for example, when a battery is electrically connected to power delivery circuit 200 in similar fashion to a regular operating condition, as described previously, with regard to FIG. 1. During a regular operating condition, a load connected to a battery can suddenly and undesirably become disconnected from the battery resulting in a voltage spike throughout a power delivery circuit, thereby creating a load dump condition. Thus, under a load dump condition, $V_S$ can be around 0 volts. However, due to the load dump condition, $V_A$ can rise much higher than the 12 volts present in a regular operating condition, thereby creating an unfavorable electrical condition in power delivery circuit 200. For example, electrical components in power delivery circuit 200 can be at risk of being exposed to an excessive voltage.

In power delivery circuit 200, surge detector circuitry 204 is configured to trigger charge pump circuitry 206, when $V_A$ breaches a threshold voltage. For example, in FIG. 2, under a load dump condition, $V_A$ can be around 27.7 volts. Thus, surge detector circuitry 204 triggers charge pump circuitry 206 by providing around 15 volts at node C1 ($V_{C1}$). In power delivery circuit 200, charge pump circuitry 206 is configured to provide a negative voltage output to charge pump interface circuitry 208 under a load dump condition. For example, when $V_{C1}$ is 15 volts, $V_{C2}$ can be around −10 volts. Charge pump interface circuitry 208 is configured to interface charge pump circuitry 206 and protection switch 210 in a load dump condition. For example, in a load dump condition, $V_G$ is adjusted such that $V_{GS}$ falls below the threshold voltage of transistor G and transistor G is off. Thus, load 220 is disconnected from the battery. In this way, power delivery circuit 200 can protect electrical components from a load dump condition using load dump protection circuitry 202.

It will be appreciated that, by disconnecting load 220 from the battery at a load maximum threshold voltage, for example, around 27.7 volts, load 220 is not exposed to a voltage higher than the load maximum threshold voltage, thereby preventing electrical damage to the load. Moreover, load 220 need not be designed to withstand voltages higher than the load maximum threshold voltage, reducing cost.

Thus, as discussed above, the present invention provides for a power delivery circuit including protection from a reverse battery condition without the risk of an internal conduction at a p-n junction in a protection switch connectable to a battery. As such, the present invention can provide for a power delivery circuit that requires no additional circuitry to protect electrical components from an internal conduction at a p-n junction diode, thereby reducing complexity and manufacturing cost. Furthermore, in an embodiment of the present invention, a power delivery circuit can include load dump protection circuitry such that electrical components can be protected from both a reverse battery and a load dump condition.

From the above description of the invention it is manifest that various techniques can be used for implementing the concepts of the present invention without departing from its scope. Moreover, while the invention has been described with specific reference to certain embodiments, a person of ordinary skill in the art would appreciate that changes can be made in form and detail without departing from the spirit and the scope of the invention. For example, a protection switch can have varying elements and configurations while still embodying the spirit of the present invention. Furthermore, while a single load is illustrated for simplicity, various loads in varying configurations can be provided. Thus, the described embodiments are to be considered in all respects as illustrative and not restrictive. It should also be understood that the invention is not limited to the particular embodiments described herein but is capable of many rearrangements, modifications, and substitutions without departing from the scope of the invention.

The invention claimed is:

1. A power delivery circuit including a protection switch, said power delivery circuit comprising:
   a load cascaded downstream of said protection switch in a reverse battery condition;
   said protection switch electrically disconnecting said load from a battery and blocking a reverse voltage from said load while holding a gate of said protection switch at substantially ground potential in said reverse battery condition;
   wherein said protection switch does not include a p-n junction diode connectable to said battery, thereby preventing an internal conduction in said protection switch in said reverse battery condition.

2. The power delivery circuit of claim 1, wherein said protection switch comprises a GaN transistor.

3. The power delivery circuit of claim 1, wherein said protection switch comprises a HEMT GaN transistor.

4. The power delivery circuit of claim 1, wherein said protection switch comprises a HEMT GaN transistor having its gate coupled to its drain through at least one resistor.

5. The power delivery circuit of claim 1, wherein said protection switch comprises a HEMT GaN transistor having its gate coupled to its drain through a coupling element.

6. The power delivery circuit of claim 5, wherein said coupling element includes at least a resistor.

7. The power delivery circuit of claim 1, wherein said protection switch comprises a negative threshold GaN transistor.

8. The power delivery circuit of claim 1, wherein said protection switch disconnects said load from said battery in a load dump condition.

9. The power delivery circuit of claim 8, wherein said protection switch disconnects said load from said battery in said load dump condition when a voltage from said battery exceeds a load maximum threshold voltage.

10. The power delivery circuit of claim 8, further comprising a negative voltage charge pump for disconnecting said load from said battery in said load dump condition.

11. The power delivery circuit of claim 1, wherein said power delivery circuit is included in an automotive electrical system.

12. A power delivery circuit including a protection switch, said power delivery circuit comprising:
    a load cascaded downstream of said protection switch in a reverse battery condition;
    said protection switch electrically disconnecting said load from a battery and blocking a reverse voltage from said load while holding a gate of said protection switch at substantially ground potential in said reverse battery condition;
    wherein said protection switch does not include a silicon field effect transistor connectable to said battery.

13. The power delivery circuit of claim 12, wherein said protection switch disconnects said load from said battery in a load dump condition.

14. The power delivery circuit of claim 12, wherein said protection switch includes a HEMT GaN transistor.

15. A power delivery circuit including a protection switch, said delivery circuit comprising:
    a load cascaded downstream of said protection switch in a reverse battery condition;
    said protection switch electrically disconnecting said load from a battery and blocking a reverse voltage from said load while holding a gate of said protection switch at substantially ground potential in said reverse battery condition;
    wherein said protection switch comprises a GaN transistor.

16. The power delivery circuit of claim 15, wherein said protection switch comprises a HEMT GaN transistor.

17. The power delivery circuit of claim 15, wherein said protection switch comprises a negative threshold GaN transistor.

18. The power delivery circuit of claim 15, wherein said protection switch comprises a GaN transistor having its gate coupled to its drain through a coupling element.

19. The power delivery circuit of claim 18, wherein said coupling element includes at least a resistor.

20. The power delivery circuit of claim 15, wherein said protection switch disconnects said load from said battery in a load dump condition.

* * * * *